US009409616B2

(12) United States Patent
Lu et al.

(10) Patent No.: US 9,409,616 B2
(45) Date of Patent: Aug. 9, 2016

(54) RIDING VEHICLE WITH SELF-CORRECTING STEERING

(71) Applicant: Prince Lionheart, Inc., Santa Maria, CA (US)

(72) Inventors: Yafei Lu, Jiangsu (CN); Jing Jing Pi, Jiangsu (CN); Thomas E McConnell, Santa Ynez, CA (US)

(73) Assignee: Prince Lionheart, Inc., Santa Maria, CA (US)

( * ) Notice: Subject to any disclaimer, the term of this patent is extended or adjusted under 35 U.S.C. 154(b) by 0 days.

(21) Appl. No.: 14/256,773

(22) Filed: Apr. 18, 2014

(65) Prior Publication Data

US 2014/0312587 A1  Oct. 23, 2014

Related U.S. Application Data

(63) Continuation of application No. 29/454,309, filed on May 8, 2013, now Pat. No. Des. 732,609.

(60) Provisional application No. 61/813,590, filed on Apr. 18, 2013.

(51) Int. Cl.
  *B62K 21/02* (2006.01)
  *B62K 9/00* (2006.01)

(52) U.S. Cl.
  CPC ........................ *B62K 9/00* (2013.01)

(58) Field of Classification Search
  CPC ........ B62K 3/002; B62K 21/00; B62K 21/10; B62K 9/00; A63C 17/012
  See application file for complete search history.

(56) References Cited

U.S. PATENT DOCUMENTS

| | | | | |
|---|---|---|---|---|
| 600,046 | A * | 3/1898 | Sparks | B62K 21/10 280/271 |
| 4,394,029 | A * | 7/1983 | Holmgren | A63C 17/045 280/11.223 |
| 4,674,761 | A * | 6/1987 | Kassai | B62K 9/02 280/271 |
| 4,714,261 | A * | 12/1987 | Kassai | A63H 17/36 280/267 |
| 6,378,884 | B1 * | 4/2002 | Kettler | B29C 44/485 280/272 |
| 6,520,517 | B1 * | 2/2003 | Chung | B62K 21/00 280/124.11 |
| 6,572,130 | B2 * | 6/2003 | Greene, Jr. | B62K 3/005 280/266 |
| 6,616,155 | B2 * | 9/2003 | Tuan | A63C 17/01 280/11.28 |
| 6,669,215 | B2 * | 12/2003 | Laporte | A63C 17/01 280/124.11 |
| 7,226,081 | B2 * | 6/2007 | Chen | B62K 21/00 280/263 |
| 7,243,931 | B2 * | 7/2007 | Chen | B62K 3/002 280/124.11 |

(Continued)

*Primary Examiner* — Brodie Follman
(74) *Attorney, Agent, or Firm* — WPAT, P.C., Intellectual Property Attorneys; Anthony King

(57) ABSTRACT

A children's ride-on vehicle with a self-straightening mechanism/feature directed to self-correct or self-straighten the steering of the vehicle as it crosses varying types and conditions of terrain. The vehicle includes a main body, a front shaft connector to connect at least one wheel to the main body, a rear shaft connector to connect at least one rear wheel to the main body; and providing a spring piece to resiliently bias at least one of said front and rear shaft connector into a specified position.

11 Claims, 16 Drawing Sheets

(56) References Cited

U.S. PATENT DOCUMENTS

| | | | | |
|---|---|---|---|---|
| 7,344,144 B2* | 3/2008 | Lin | B62B 3/001 | 280/47.34 |
| 7,699,325 B2* | 4/2010 | Durbin | B62B 7/04 | 280/47.11 |
| 8,201,840 B2* | 6/2012 | Kettler | B62K 9/00 | 280/272 |
| 8,342,546 B2* | 1/2013 | Bryant | B62K 21/08 | 280/272 |
| 8,517,406 B2* | 8/2013 | Diekman | B62K 9/02 | 280/278 |
| 8,579,300 B2* | 11/2013 | Fraley | A63C 17/012 | 280/11.28 |
| 8,939,454 B2* | 1/2015 | Stillinger | B62K 3/002 | 280/271 |
| 2004/0100053 A1* | 5/2004 | Chen | B62K 3/002 | 280/87.041 |
| 2005/0140108 A1* | 6/2005 | Chen | B62K 3/002 | 280/87.041 |
| 2007/0096424 A1* | 5/2007 | Chen | B62K 21/00 | 280/272 |
| 2008/0197594 A1* | 8/2008 | Ling | B62K 21/00 | 280/87.041 |
| 2010/0059956 A1* | 3/2010 | Stillinger | A63C 17/012 | 280/87.041 |
| 2013/0001909 A1* | 1/2013 | Stillinger | B62K 21/00 | 280/87.041 |
| 2014/0042717 A1* | 2/2014 | Chan | B62K 3/002 | 280/5.509 |
| 2014/0312587 A1* | 10/2014 | Lu | B62K 9/00 | 280/87.03 |

* cited by examiner

RIDING VEHICLE WITH SELF-CORRECTING STEERING

CROSS-REFERENCE TO RELATED APPLICATIONS

This application is related to the following applications: (1) U.S. Provisional Patent Application No. 61/813,590, "Motobike", filed Apr. 18, 2013; (2) U.S. Design Pat. Application No. 29/454,309, "Motobike", filed May 8, 2013. All of these applications are incorporated by reference herein in their entirety.

Although incorporated by reference in its entirety, no arguments or disclaimers made in the related application apply to this application. Any disclaimer that may have occurred or might occur during the prosecution of the above-referenced application is hereby expressly rescinded.

BACKGROUND OF THE INVENTION (1) Field of the Invention

The field of the invention relates to vehicles, more particularly to a children's ride-on vehicle with a mechanism that can act as a suspension system and/or a steering system allowing a rider to steer by shifting his or her weight.

(2) Description of Related Art Including Information Disclosed Under 37 CFR 1.97 and 1.98

At present, there are numerous children's ride-on vehicles with steering mechanisms that typically utilize an assembly array of multiple moving parts (i.e., stem, handle bar, head tube, fork, rack-and-pinion). Consequently, should one of the parts break or malfunction, there is typically a tedious, inconvenient ordeal of finding the broken or malfunctioning part and attempting to fix it, or one may resort to purchasing an entirely new replacement vehicle. Further, vehicles with steering mechanisms typically are not self-correcting and thus not hands-free. Even more, steering in children's vehicle involving multiple parts pose a danger of accidentally having children's fingers caught in between moving parts.

Another disadvantage is that children's ride-on vehicles are typically adapted specifically for only certain types of terrain, preferably smooth surfaces (i.e., concrete, asphalt), and in turn would be unable to drive or ride across uneven surfaces and/or changing terrains (i.e., concrete to soil/grass, descending stairs, bumps in the road, etc.). This is in part due to lack of suspension systems in children's ride-on vehicles. As a result, a rider may lose control of the vehicle or suffer from unbearable bumpy ride.

Accordingly, there remains a continuing need for a vehicle that caters to the range of abovementioned needs while incorporating a self-straightening mechanism/feature, shock-absorbing, and a novel way of steering having minimum moving parts.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

Accordingly, the present invention is a vehicle with a self-correction mechanism/feature directed to self-correct the steering of a vehicle. Furthermore, the self-correction mechanism/feature is able to self-align the steering in a straight line as it crosses varying types and conditions of terrain. A driver may steer the vehicle with the simple action of leaning sideways in a desired direction such that, for example, when leaning to one's left thereby directing one's weight and pressure to that side, the vehicle will turn left—and the same happens by leaning to one's right. Once pressure is released from either side by no longer directing one's weight in either direction, the vehicle self-aligns and steers in a straight line due to the self-correction mechanism/feature.

In a preferred embodiment of the present invention, the self-straightening vehicle comprises: a main body; a front shaft connector coupled to the main body; at least one front wheel coupled to the front shaft connector; a rear shaft connector coupled to the main body; at least one rear wheel coupled to the rear shaft connector; and a biasing mechanism disposed between said main body and either or both of front shaft connector and rear shaft connector. The purpose of the connection is to bias either one or both of the front and rear shaft connectors in a straightening alignment such that at least one such connection will in turn bias the main body into an upright position. Further contemplated is that the front shaft connector and the rear shaft connector are pivotably coupled to the main body.

Further, it is contemplated that the biasing mechanism is a resilient member, a resilient piece, a resilient block, a resilient spring such as a compression spring, a tension spring, a torsion spring, a leaf spring, a coil spring, a linear-flexing spring. It is still further contemplated that the resilient member is a resilient "I-beam" having a first flange connected to a parallel second flange by a resilient web. In still further preferred embodiments, the "I-beam" is positioned such that a longitudinal axis of the resilient "I-beam" parallels with a pivoting axis of at least one of said first connecting shaft and said rear connecting shaft. It is further contemplated that the "I-beam" is composed of resilient material including but not limited to silicone, rubber, and thermoplastic elastomer (TPE). Also contemplated is that the pivoting axis of the front connecting shaft is disposed at a first angle relative to a leveled axis of the main body, wherein the first angle is between 25 to 55 degrees. Further contemplated is that the pivoting axis of the rear connecting shaft is disposed at a second angle relative to the leveled axis of the main body, wherein the second angle is between zero to 55 degrees. Further contemplated is the front connecting shaft has an interior space and a slit connecting said interior space and a slit connecting said interior space to an exterior environment; wherein the second flange is disposed in the interior space, while the web is disposed through said slit.

Further contemplated is that the first and second flanges have a size ratio between a minimum of 3:1 to a maximum of 1:1.

Another aspect of the invention is directed to a self-correcting mechanism for vehicle steering. In preferred embodiments, the self-correcting mechanism comprises: a resilient spring piece; a shaft connector having a pivoting axis to pivotably couple at least one wheel to a main body of the vehicle; wherein the shaft connector pivots along the pivoting axis in a pivoting range of movement; and wherein the resilient spring piece is disposed between the shaft connector and the main body of the vehicle to resiliently bias the shaft connector into a specified position in the pivoting range of movement.

It is contemplated in some embodiments that the shaft connector has the following: an outer casing; a slit opening disposed on said outer casing parallel to the pivoting axis; an internal space enclosed by the outer casing; and wherein one of said first and second flanges of the "I-beam" is disposed in the internal space, and the web is disposed through the slit opening, exposing the other one of said first and second flanges in the exterior environment exterior to making biasing contact with the main body of the vehicle.

The I-Beam can have many constructions. For example, the I-beam can have at least one internal through conduit disposed in the "I-beam" along a longitudinal axis of the I-beam. In another embodiment, the I-Beam is entirely solid without any through conduits. In other embodiments, the I-Beam can be entirely replaced by similarly resilient block of like material, not necessarily having a cross-section shape of an English letter I or H. For example, it can be a rubber piece with straight edges, or it can be "rubber band" type of resilient means, performing the same function of biasing or pulling the steering into a particular position (i.e., straight position).

Yet another aspect of the invention is directed to a method of effectuating self-corrective steering in a vehicle such that the steering is self-returned and aligned to a specified steering direction after the steering is forcibly altered and moved away from the specified steering direction. This objective is achieved by: providing a vehicle having a main body, a front shaft connector to connect at least one wheel to the main body, a rear shaft connector to connect at least one rear wheel to the main body; and providing a spring piece to resiliently bias at least one of said front and rear shaft connector into a specified position.

In another embodiment of the method, a catch is further provided in the front shaft connector to receive one of the two flanges. In still further preferred embodiments, the method further comprises providing an abutting and biasing contact between the other one of the two flanges and the main body of the vehicle to bias the front shaft connector into the specified steering direction.

Among the many different possibilities contemplated, the present embodiment as shown in the drawings is a children's vehicle; yet, it is further contemplated that the same steering/self-alignment mechanism may be applied towards children's and adult's vehicles alike including but not limited to unicycles, bicycles, tricycles, etc. Furthermore, the present embodiment is a non-motorized vehicle; however, alternative embodiments may be motorized.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

The present embodiment as shown in the drawings is a children's vehicle, however, the same may be applied towards adult vehicles of all types and sizes.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Figure 1:
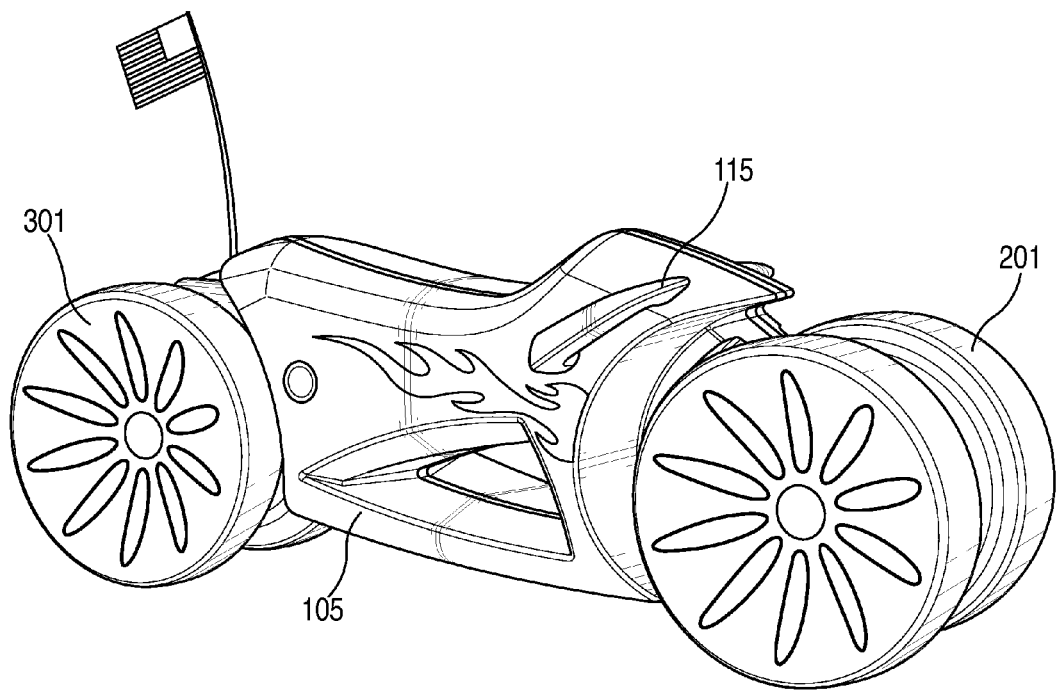
FIG. 1 is a perspective view of a first embodiment of a self-straightening vehicle.

FIG. 1 shows an embodiment of a vehicle, which comprises a main body (left and right panels) 105, two handles (left and right) 115, two front wheels 201, and two back wheels 301. Here, the lower portion of the main body 105 has a through hole; however, other embodiments may have a solid body and/or through hole(s) in other portions of the body. The vehicle shown here is non-motorized, and is designed as a ride-on toy vehicle for children. The two handles 115 are fixed to the main body 105, the handles 115 do not turn nor do they pivot relative to the main body 105.

In the preferred embodiment, the main body 105 is preferably made of light plastic material, and is hollow, containing no moving mechanical parts. The top surface area of the main body 105 opposite from the handles 115 is a seat.

Figure 2:
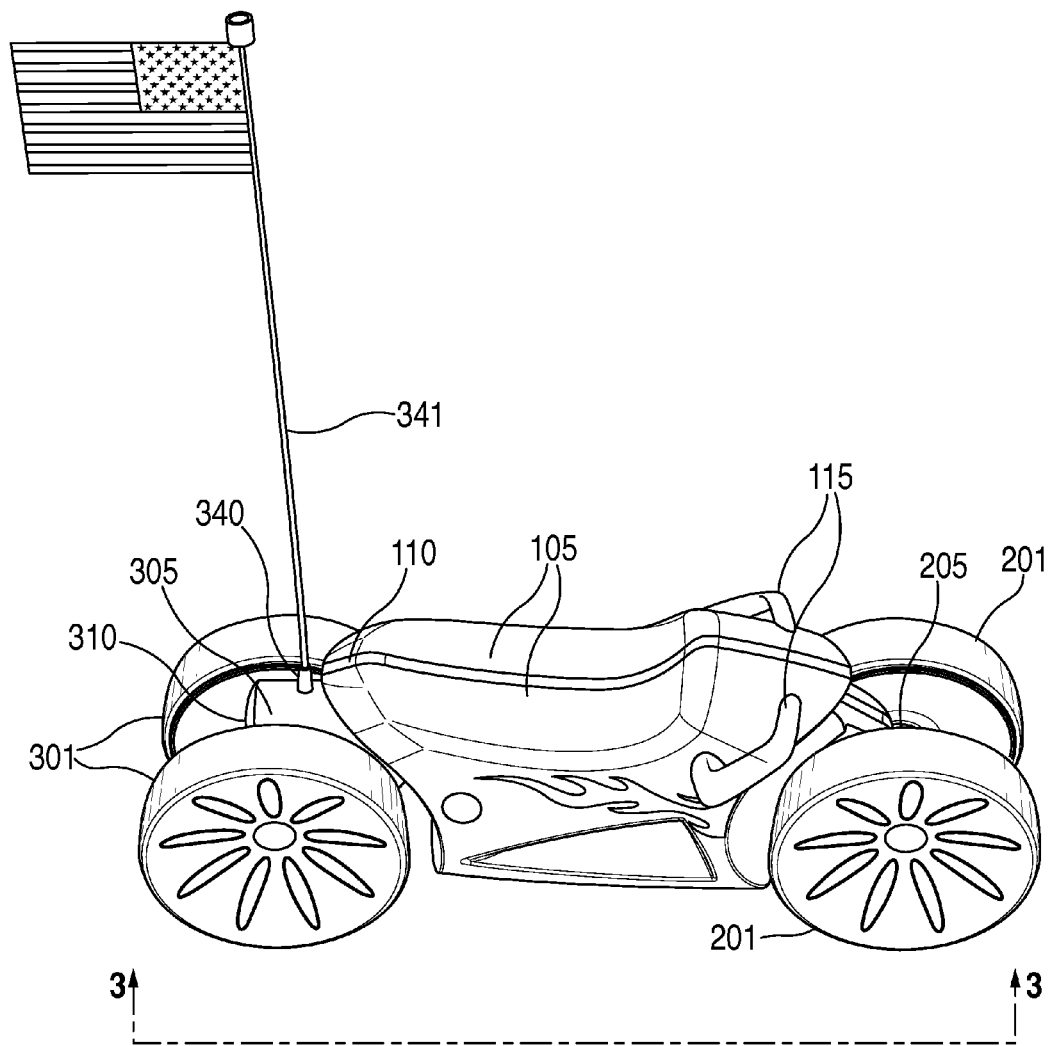
FIG. 2 is a perspective side view of a first embodiment of the self-straightening vehicle.

FIG. 2 shows an elevated perspective side view of the vehicle. A rear shaft connector 305 connects the two back wheels 301, and a second shaft connector 205 connects the two front wheels 201. Optionally, a flagpole holder 340 may be coupled to the shaft connector 305; in turn, a flagpole/antenna 341 may be placed inside the flagpole holder 340. In this embodiment, the two handles 115 do not turn or pivot; instead, the user holds onto to the handle bars 115 and steers by leaning one's body weight to the left or to the right thereby applying pressure to that side allowing for steering. Once pressure is released from either side and/or by no longer exerting pressure/weight to either side, the vehicle will self-align itself and steer in a straight line.

As will be discussed in further detail later, the ability for the contemplated embodiments to self-return the main body 105 to an upright position (i.e., front wheels in a straight position), largely depends on factors such as weight of the rider, and strength of the resilient piece. It should be understood that although the terms "self-correction," "self-correcting," "self-straightening," "self-returning" are used throughout this specification, these terms simply mean the function to facilitate a rider's ability to shift his or her center of gravity back to the center of the vehicle after having leaned to one side to steer the front wheels to that side.

Figure 3:
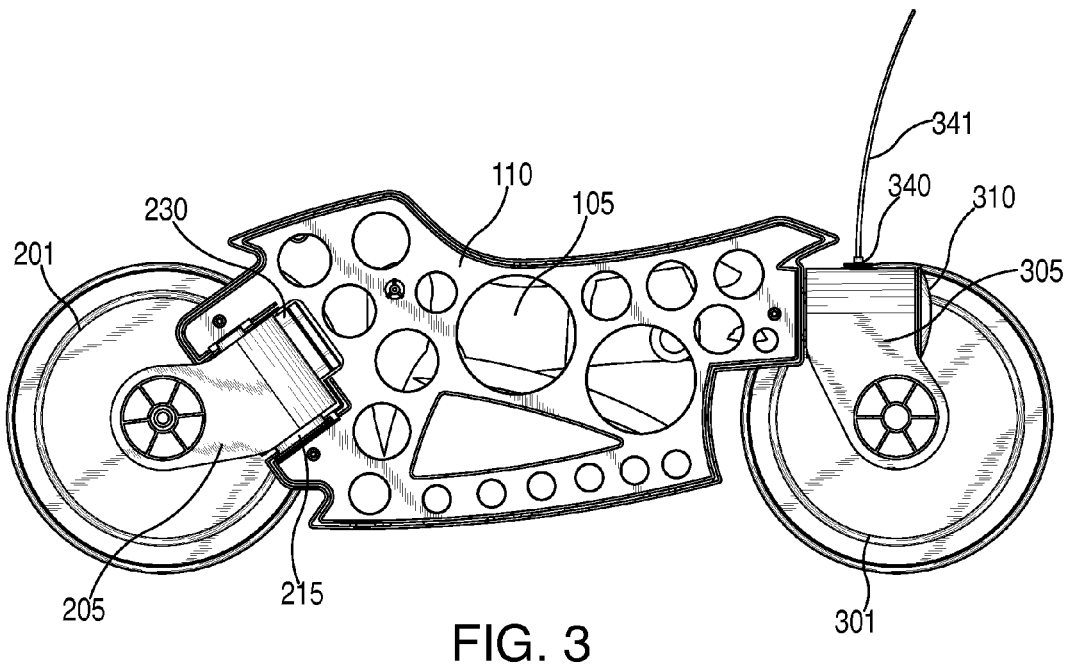
FIG. 3 is a side view taken along line 3-3 of FIG. 2, with left body panel removed, and both the front and rear shaft connectors are intact so the inner constructions of front and rear shaft connectors are not exposed.

An important feature of the present invention is a resilient spring piece 230, 330. FIG. 3 shows a partially exposed view taken along line 3-3 of FIG. 2 illustrating an embodiment of the vehicle having one resilient spring piece 230 shown in the front of the vehicle.

In this embodiment, the partially shown resilient spring piece 230 is coupled to the front shaft connector 205. FIG. 3 further depicts an inner body frame 110 and right side of the main body 105 intact with the body frame 110. As shown in the illustration, the particular embodiment of the inner body frame 110 has round holes scattered throughout the frame for various reasons (e.g., structural integrity, lighter weight, less cost on material), however, other embodiments may for example, be a solid frame and/or may readily be modified as dictated by the aesthetic or functional needs of particular applications of the vehicle.

In FIG. 3, the inner workings of rear shaft connector 305 are not shown. In one embodiment, a resilient spring piece 230 is disposed within rear shaft connector 305 as will be discussed later. In another embodiment, there are no further resilient spring piece 230 in the rear shaft connector. One skilled in the art would appreciate that when the front resilient spring piece 305 is sufficiently strong, a rear resilient spring piece would not be necessary. Likewise, when the rear resilient spring piece 305 is sufficiently strong, a front resilient spring piece would not be necessary. The purpose of the resilient spring piece 305 is to resiliently connect the shaft connector to the main body. In one embodiment, the spring piece 305 resiliently biases the shaft connector 205 into a specified position in the pivoting range of movement.

Figure 4:
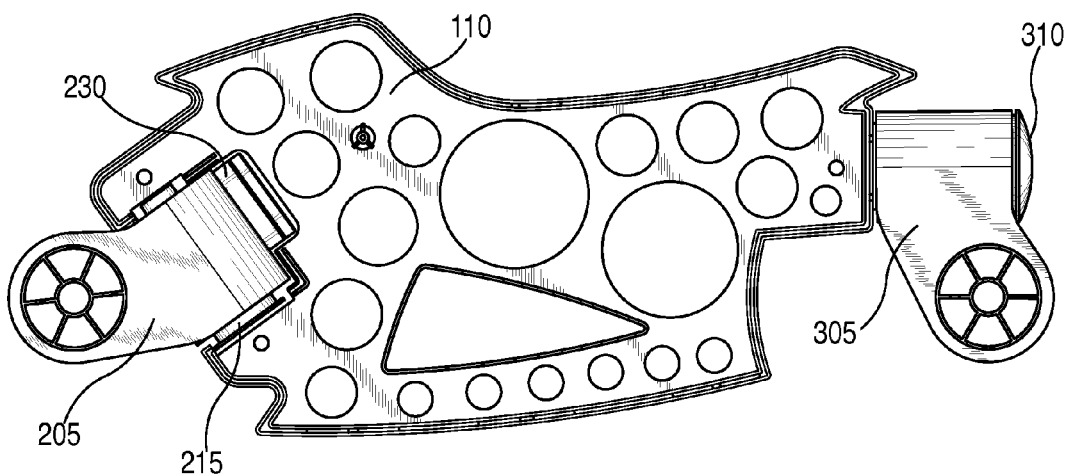
FIG. 4 is a perspective side view of the self-straightening vehicle with wheels, left body panel, and right body panel, removed.

FIG. 4 shows a side view of the inner body frame 110, the front end coupled to the front shaft connector 205 (interior of which is not exposed) and shaft sleeve 215, and the rear end coupled to a shaft sleeve 315, shaft connector 305 (interior of which is not exposed) and rear cover 310.

Figure 5A:
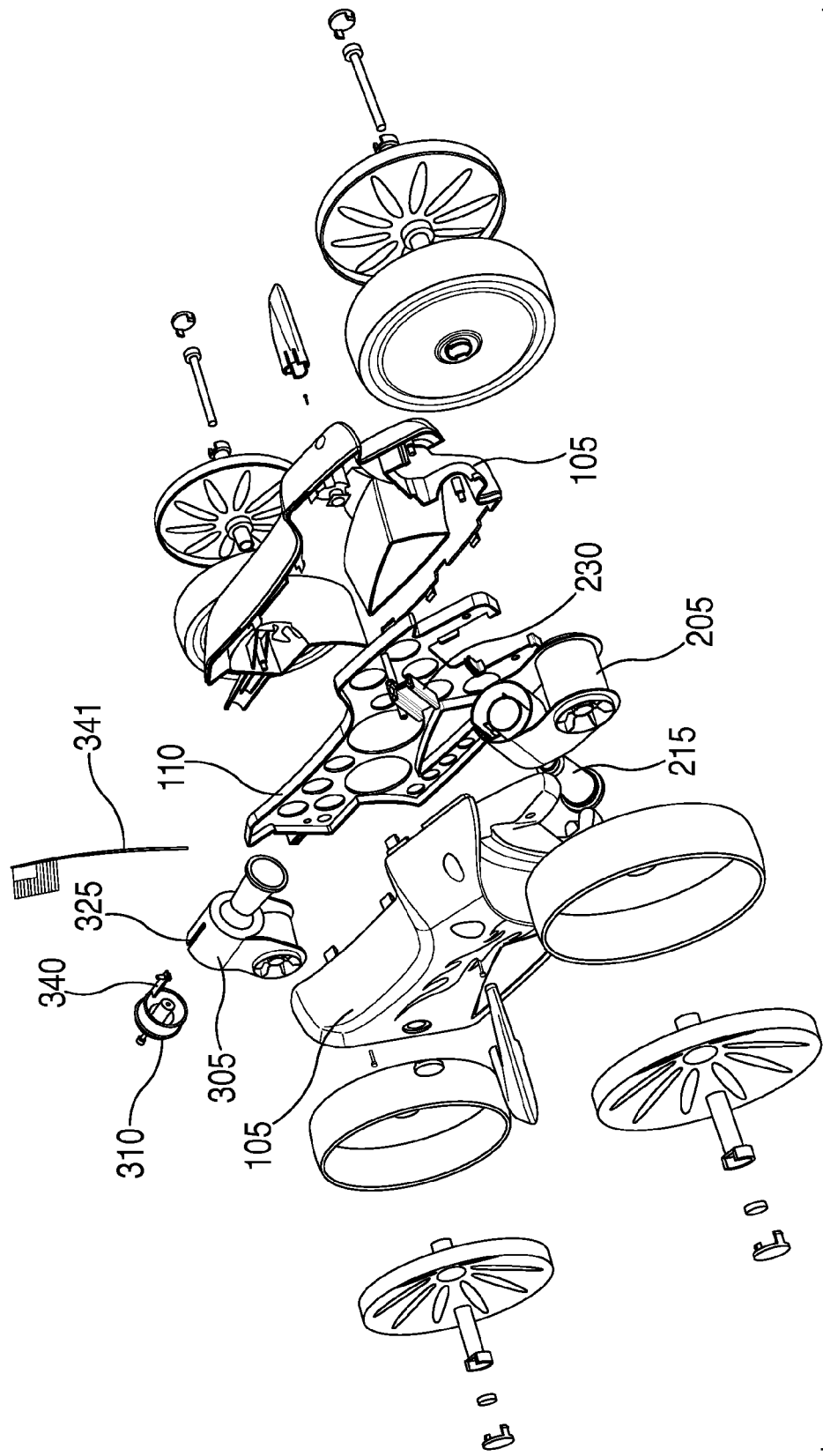
FIG. 5A is an exploded front perspective view of the embodiment of FIG. 1.
Figure 5B:
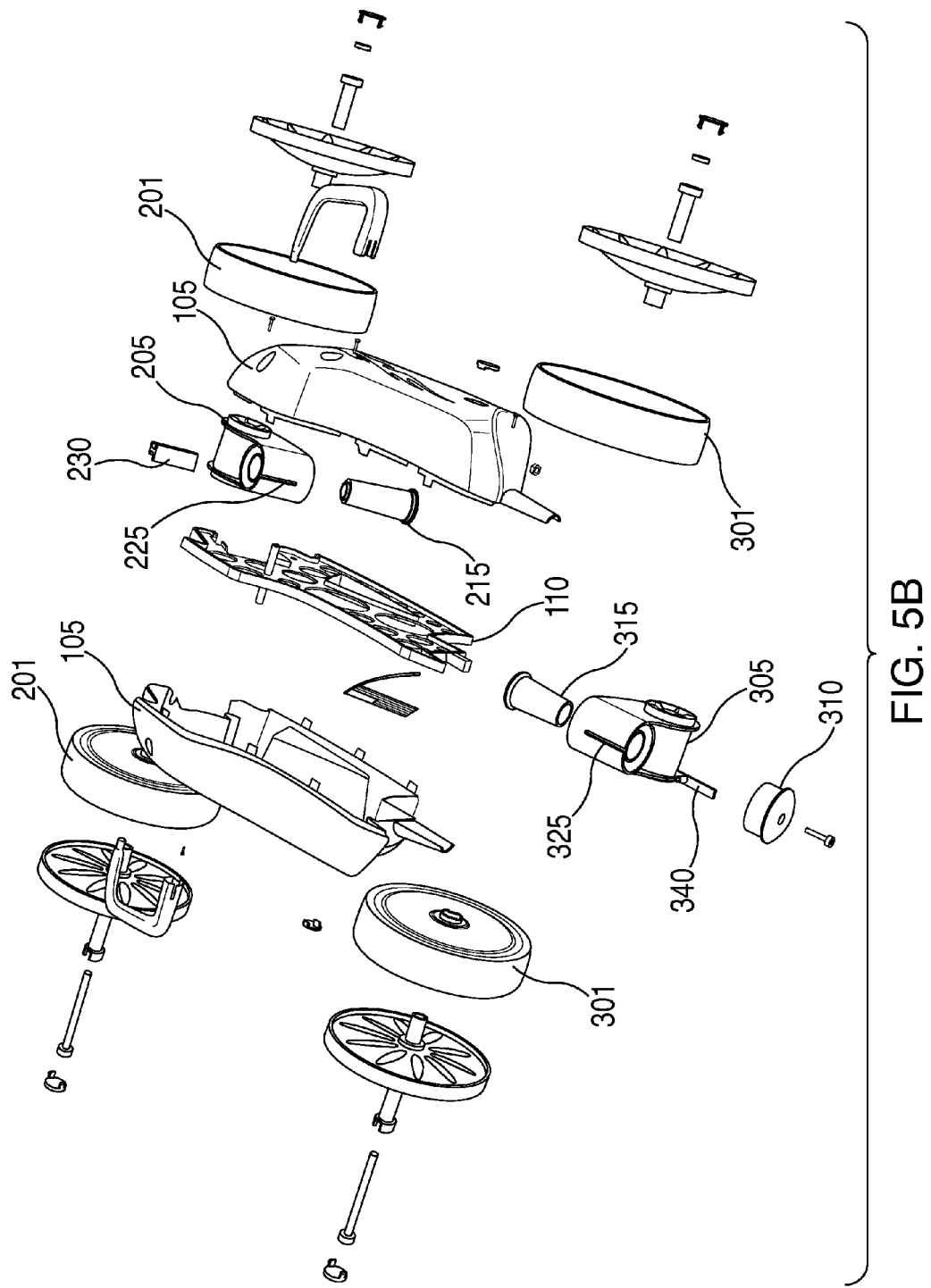
FIG. 5B is an exploded back perspective view of the embodiment of FIG. 1.

FIG. 5A and 5B depict exploded front and back perspective views of a first embodiment of FIG. 1, respectively. The first preferred embodiment has only one resilient spring piece 230 located in the front end of the vehicle. The assembly of the shaft sleeve 215, shaft connector 205 and resilient spring piece 230 are coupled to the inner body frame 110. The rear shaft sleeve 315 is inserted into the rear shaft connector 305, and the assembly is then coupled to the rear end of the inner body frame 110. Optionally, a flagpole holder 340 may be inserted through the rear shaft connector slit 325; in turn, an antenna or flagpole 341 may be placed in the flagpole holder 340. The rear opening of the shaft connector 305 may be covered with a rear cover 310.

Figure 6A:
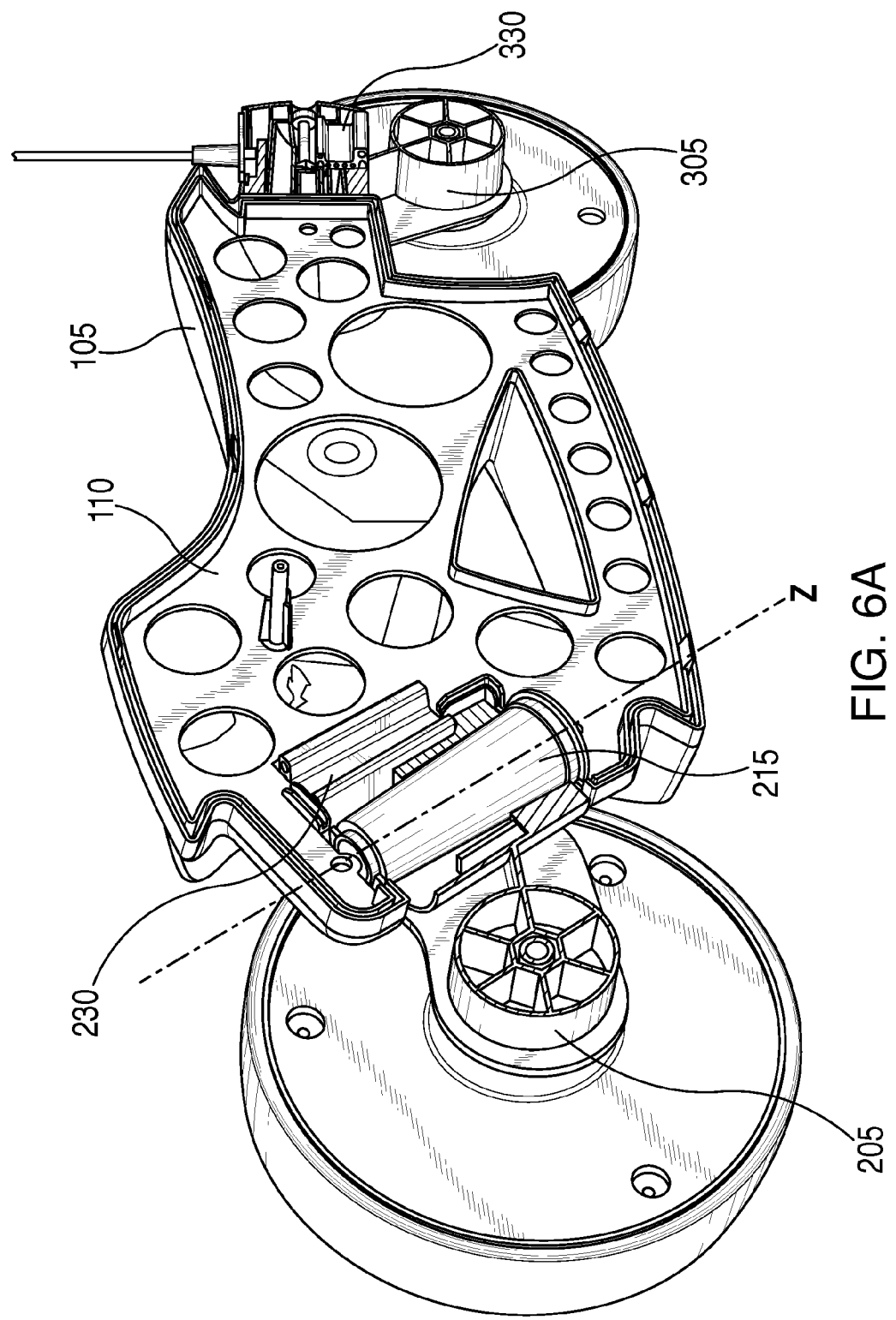
FIG. 6A is a perspective view of the self-straightening vehicle with left body panel removed, and the left sides of front and rear shaft connectors removed, exposing both resilient pieces.
Figure 6B:
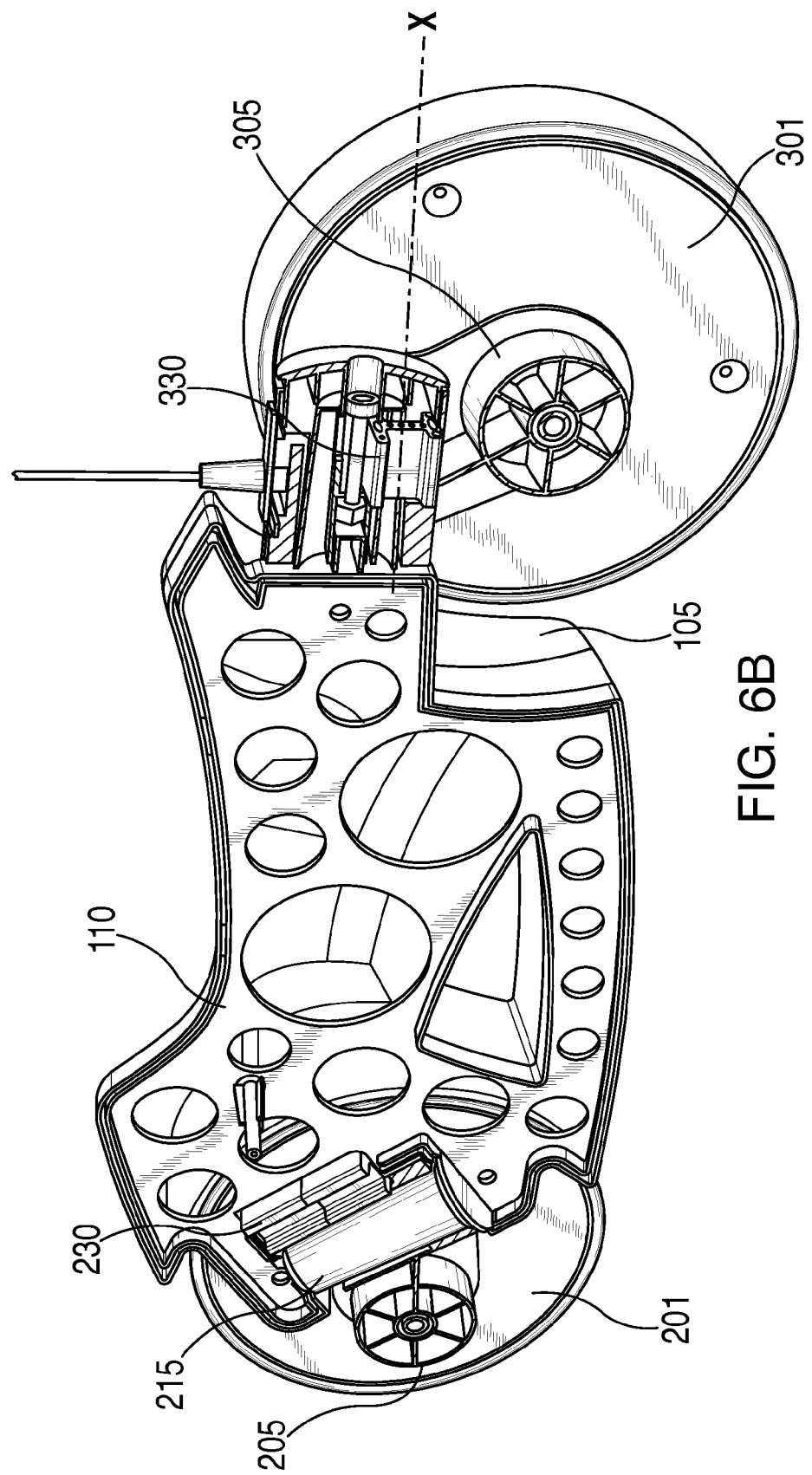
FIG. 6B is a perspective view of the same self-straightening vehicle from FIG. 6A, with left body panel removed, showing particular details of the resilient piece near the rear wheel.

FIG. 6A and 6B depict front and back cross-sectional exposed perspective views of another embodiment of a self-straightening vehicle. Here, resilient spring pieces/"I-beams" 230, 330 are located both in the front and in the back of the vehicle. In this particular embodiment, there are two resilient spring pieces 230 stacked in the front of the vehicle for added strength, and a single "I-beam" 330 placed length-wise in the rear of the vehicle.

The resilient spring pieces 230, 330 are integral to facilitate the self-corrective steering mechanism/feature of this invention. Preferred embodiments of this invention have at least one resilient spring piece. The resilient spring pieces 230, 330 may be placed only in the front of the vehicle, only in the back, or in both the front and back of the vehicle. The resilient spring pieces 230, 330 serve several functions, the main functions enumerated as follows. First, there is a shock absorption function when riding along a variety of terrain be it bumpy or smooth. Imagine, as one of the two rear wheels 301 runs over a small rock, the rear shaft connector 305 simply pivots along axis X to accommodate the rock, while the main body where the rider sits, remains substantially upright. The same applies to the front shaft connector.

Second, the spring pieces 230, 330 serve to restore the direction of the vehicle to steer in a straight line. The spring pieces 230, 330 are resilient which serve to bias the shaft connector(s) 205, 305 in position. Most preferably, the resilient spring piece is made of a resilient material like silicone. Less preferably, the "I-beam" is made of rubber and/or thermoplastic elastomer (TPE). Without any resilient spring piece 230, 330 in the vehicle, the front wheels 201 and the shaft connector 205 would be free to wobble and swing along axis Z unable to reposition and restore the vehicle's direction of travel; similarly, without the rear spring piece 330, the rear shaft connector 305 would wobble and swing along axis X unable to restore the vehicle's direction of travel in a straight line.

Figure 7A:
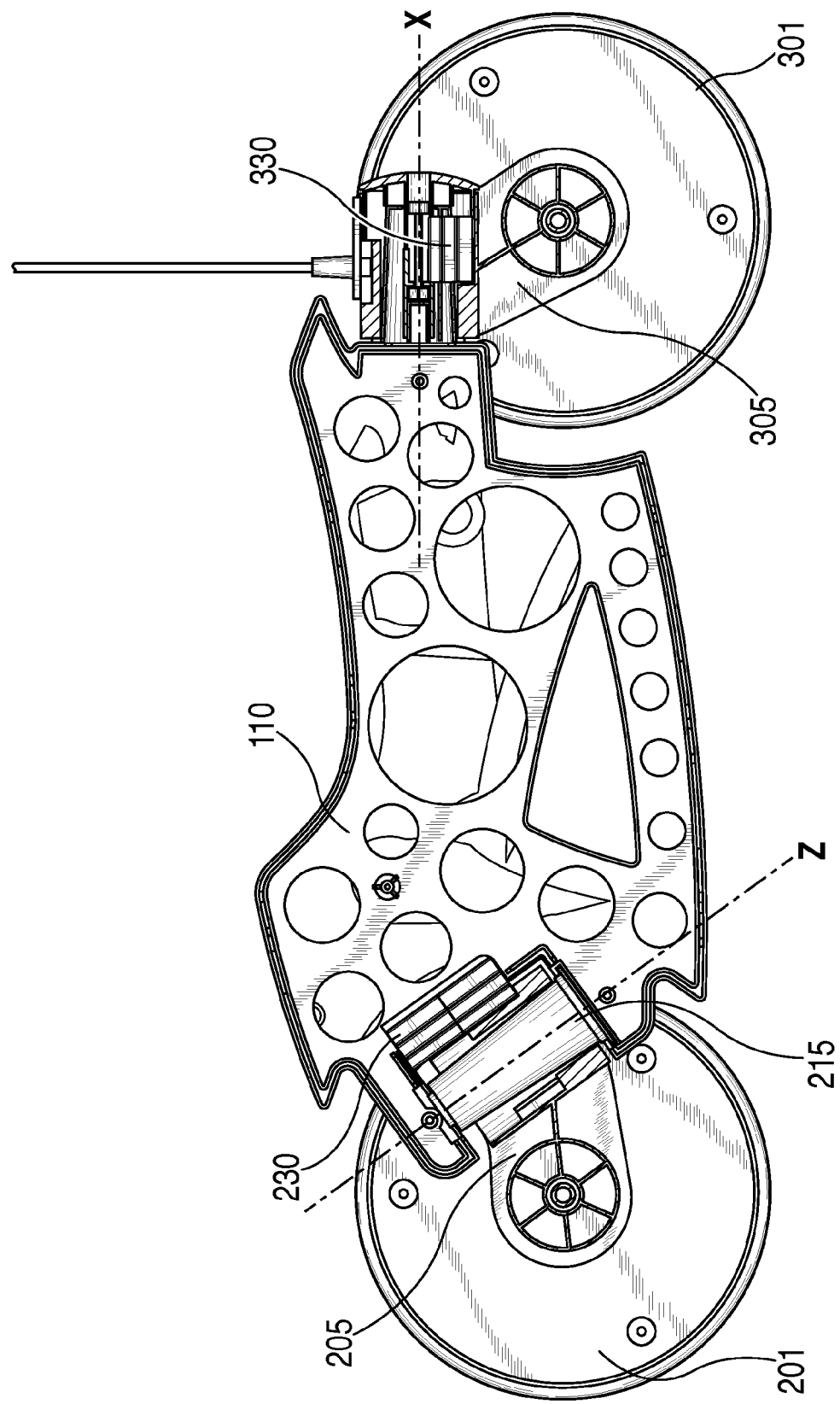
FIG. 7A is a perspective view of the self-straightening vehicle with left body panel removed, and the left sides of front and rear shaft connectors removed, exposing both resilient pieces.
Figure 7B:
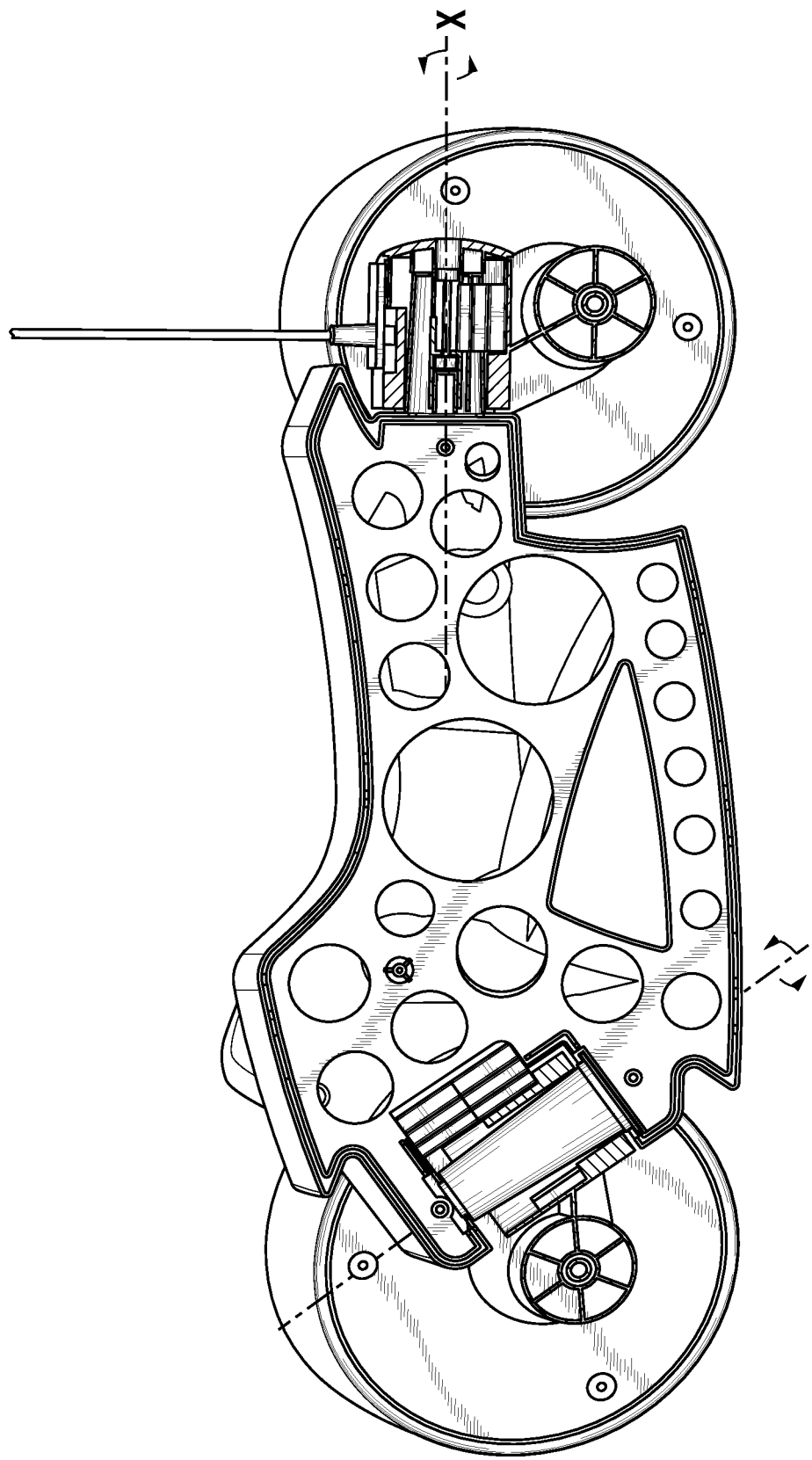
FIG. 7B is the same vehicle from FIG. 7A, illustrating pivoting axes of front and rear shaft connectors.

FIGS. 7A and 7B show a cross-sectional view of the second embodiment illustrating an exposed shaft connector 205 that couples to one front wheel 201 (the other one temporarily removed for illustration purposes), and an exposed rear shaft connector 305 that couples to one rear wheel 301 (the other one temporarily exposed) together. The "I-beams" 230 stacked in the front of the vehicle are parallel to axis Z. The pivoting axis Z of the front connecting shaft 205 is disposed at a first angle relative to a leveled axis of the main body, wherein the first angle is between 25 to 55 degrees, more preferably, 45 to 55 degrees, most preferably, 54 degrees. The "I-beam" 330 in the rear of the vehicle is placed parallel to axis X. The pivoting axis X of the rear connecting shaft 305 is disposed at a second angle relative to the leveled axis of the main body, wherein the second angle is between 0 to 55 degrees, or most preferably, at 0 degrees. As depicted in FIGS. 7A and 7B, the "I-beams" 230, 330 are positioned coupled to the respective shaft connector 205, 305 such that upon leaning and applying pressure to the right or to the left of the vehicle, the front shaft connector 205 and front wheels 201 may rotate and pivot along axis Z, and the rear shaft connector 305 and rear wheels 301 would rotate and pivot along axis X.

Figure 8A:
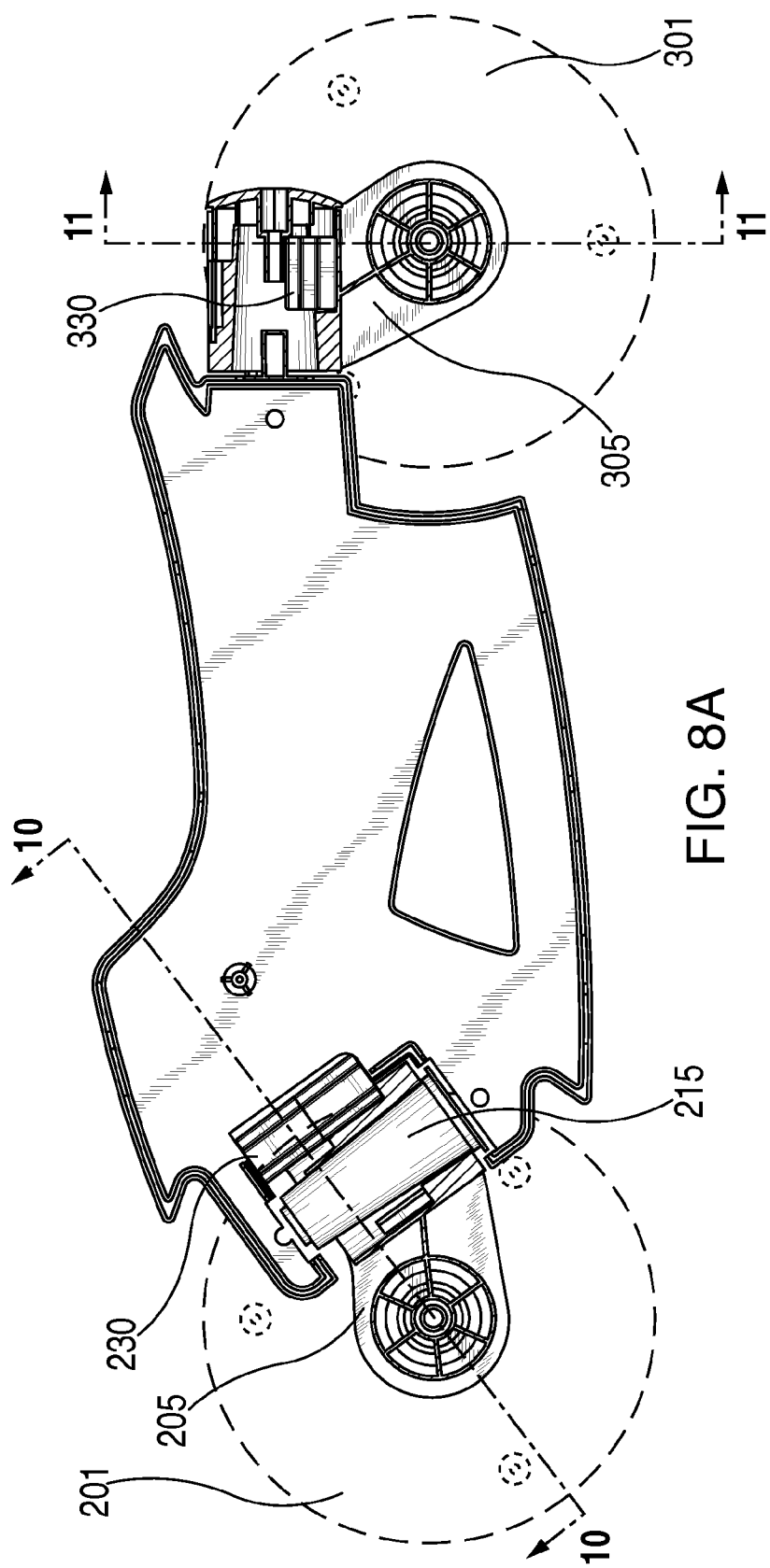
FIG. 8A is a schematics of the self-straightening vehicle.
Figure 8B:
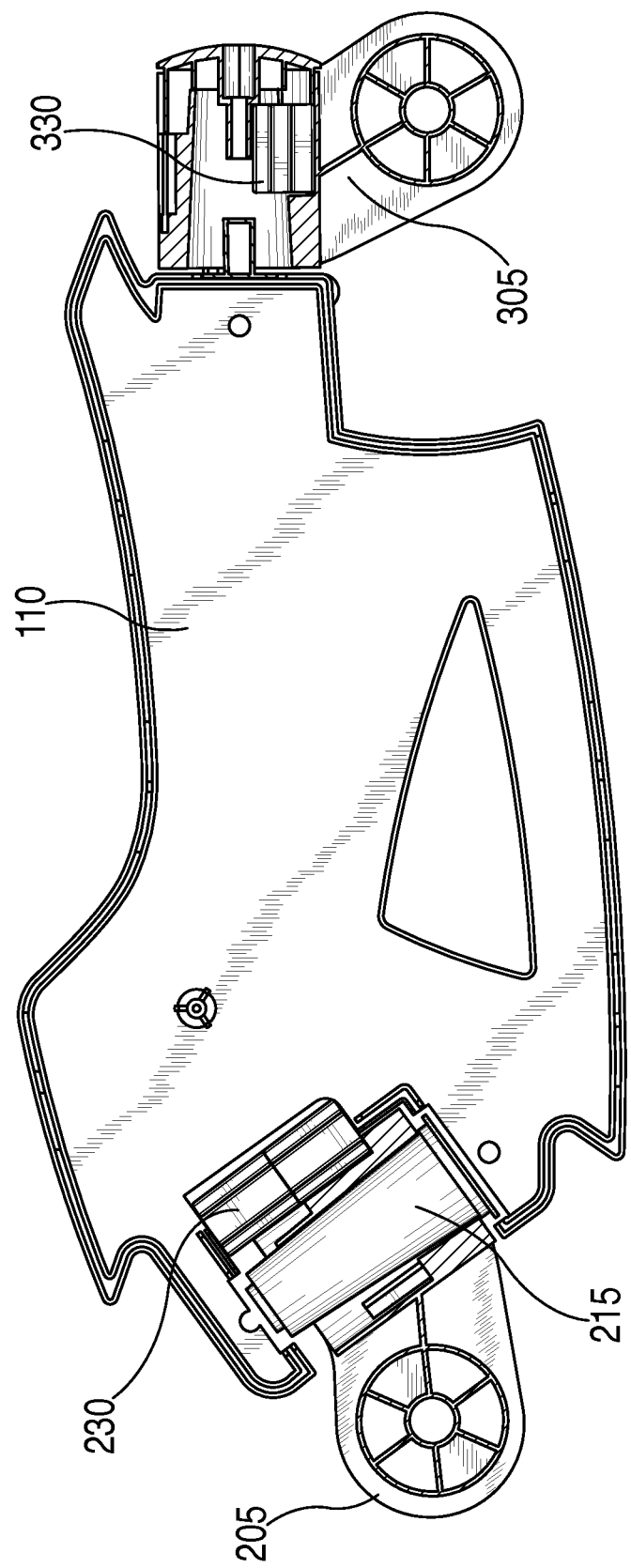
FIG. 8B is a schematics the self-straightening vehicle without wheels.

FIGS. 8A and 8B show side cross-sectional schematics of the second embodiment having "I-beams" located in both front and back of the vehicle. FIG. 8A shows the vehicle with a front and a back wheel 201, 301. FIG. 8B shows the vehicle without the front and back wheels 201, 301.

Figure 9:
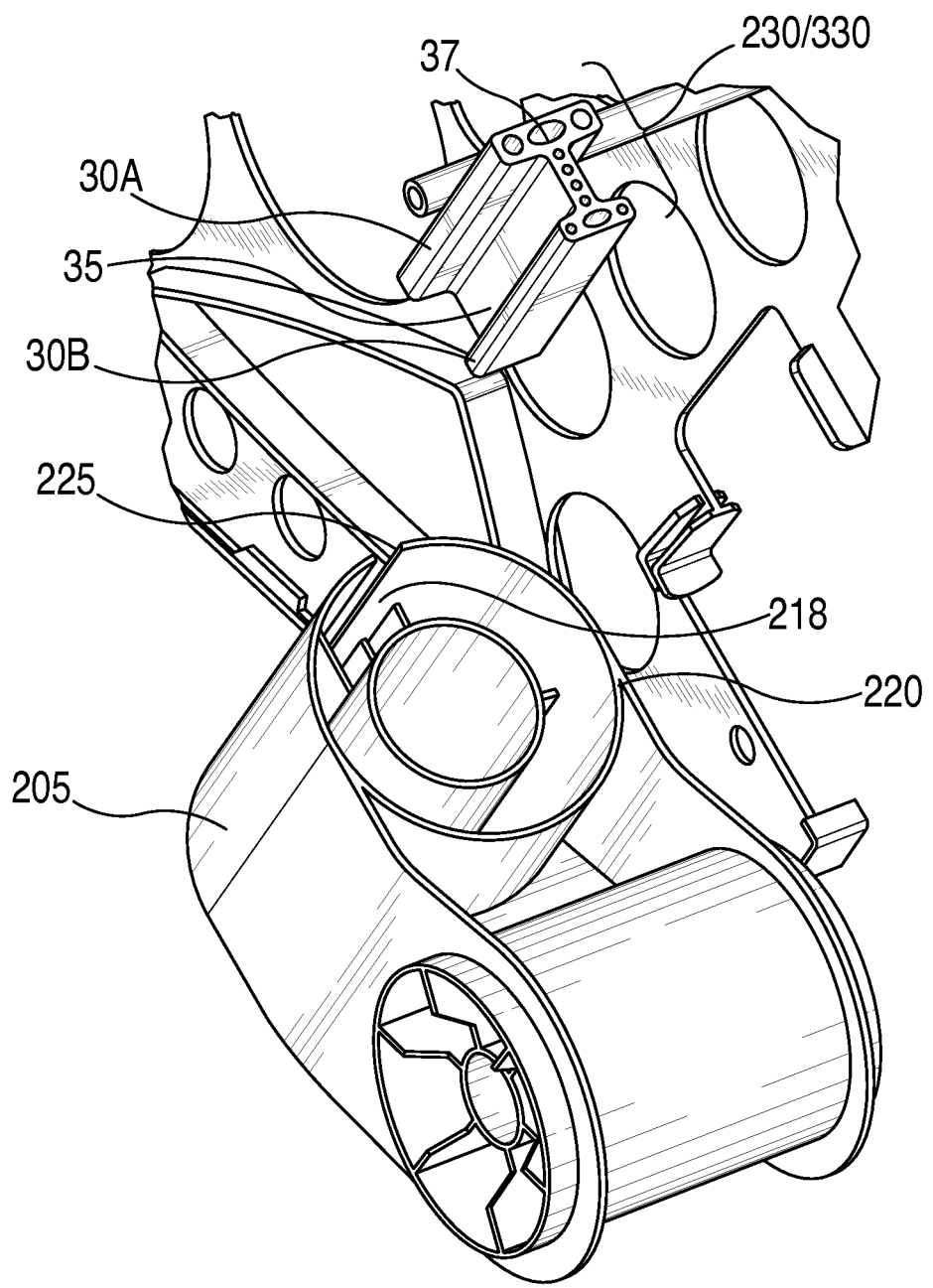
FIG. 9 illustrates the relationship of the resilient spring piece and the front shaft connector.

FIG. 9 depicts a close-up view of an embodiment of a resilient spring piece and the front shaft connector 205. The spring piece 230 as shown is an I-Beam, to be slid into slit 225 of shaft connector 205.

It should be noted that the resilient spring piece can have a range of sizes and shapes, with or without flanges so long as the spring piece is resilient and can resiliently abut against a surface and/or resiliently bias the shaft connector 205 into a specified position within a pivoting range of movement along the respective front and back axes of rotation. Therefore, one embodiment can implement one such I-Beam. Another embodiment can implement two such I-Beams stacked as shown in FIG. 8A. Yet another embodiment can implement two such I-Beams on different slits (not shown) along the circular wall of the shaft connector. The contemplated I-Beams are designed to bias the shaft connectors in a position by its resistance to pulling and distorting. The I-Beam design is preferred because a new one can easily replace a broken one by sliding it into place.

There may be other designs where some kind of resilient block is used to bias the shaft connectors into a position by its resistance to squeezing and depressing.

In one embodiment, the pivot range is 45° in each direction. In another embodiment, the pivot range is 40°. In another embodiment the pivot range, is 35°. Yet another embodiment is 30°. Still further contemplated is a pivot range of 25°. Another contemplated pivot range is 20°. Still another contemplated pivot range is 15°. Yet another contemplated pivot range is 10°. Yet another contemplated pivot range is 5°.

As described throughout this specification and drawings, the most preferred embodiment of a resilient spring piece is an "I-beam" 230/330 having a first flange 30A connected to a second flange 30B via a flexing web 35, wherein the first and second flanges 30A, 30B are parallel to each other. Preferred embodiments of the resilient "I-beam" 330 are made of a material selected from a group consisting of silicone, rubber, and thermoplastic elastomer (TPE). The ratio of sizes between the widths of the first and second flanges may vary; however, in preferred embodiments, the ratio of sizes between the first and second embodiments varies between 3:1 to 1:1. In preferred embodiments, said "I-beam" is a solid resilient piece with no internal conduits. More preferably, the resilient spring piece may have at least one internal conduit 37 disposed through the body, along a longitudinal axis of the "I-beam" 230/330.

In a preferred embodiment, the shaft connector 205 has an outer casing 220; a slit opening 225 disposed on the outer casing 220; an internal space/catch 218 enclosed by the outer casing 220; and wherein one of the first and second flanges 30A, 30B of the "I-beam" 230 is disposed in the internal space/catch 218 to receive one of the two flanges 30A, 30B, and the web 35 is disposed through the slit opening 225, exposing the other of said first and second flanges 30A, 30B in the exterior environment exterior to make biasing contact with the main body of the vehicle 105.

Figure 10:
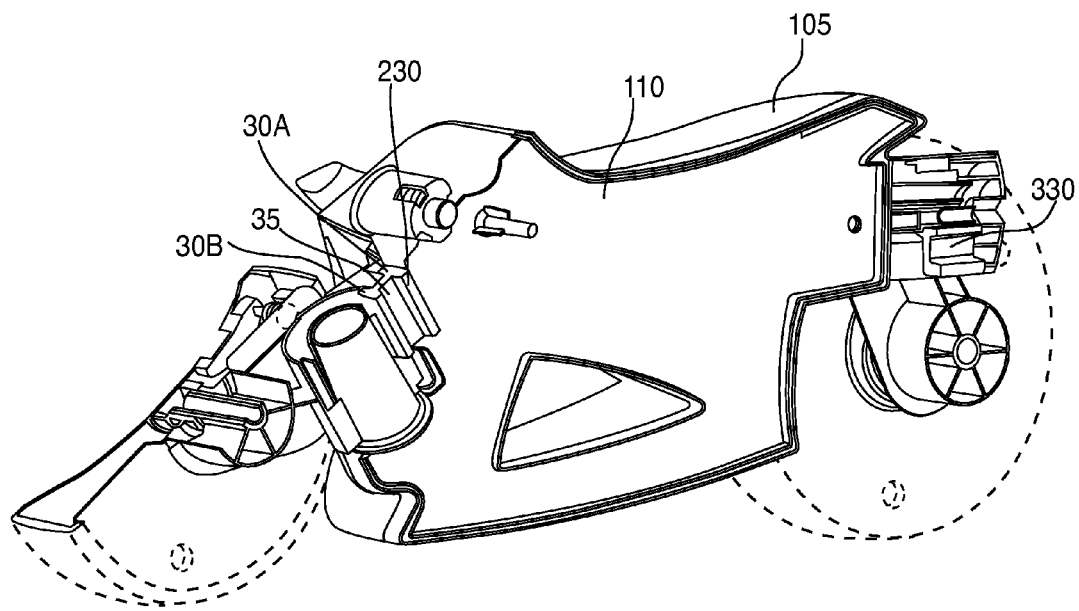
FIG. 10 is a schematics view taken along line 10-10 of FIG. 8A, illustrating positions of the resilient pieces.

FIG. 10 is a cross-sectional perspective view taken along line 10-10 of FIG. 8A. In this embodiment, the resilient spring piece "I-beam" 230 located in the front of the vehicle is positioned between the shaft connector 205 and main body 105, 110 thus facilitating an abutting and biasing contact between one of the two flanges 30A and the main body 105, 110 of the vehicle to bias the front shaft connector 205 such that the vehicle steers in a straight direction.

Figure 11:
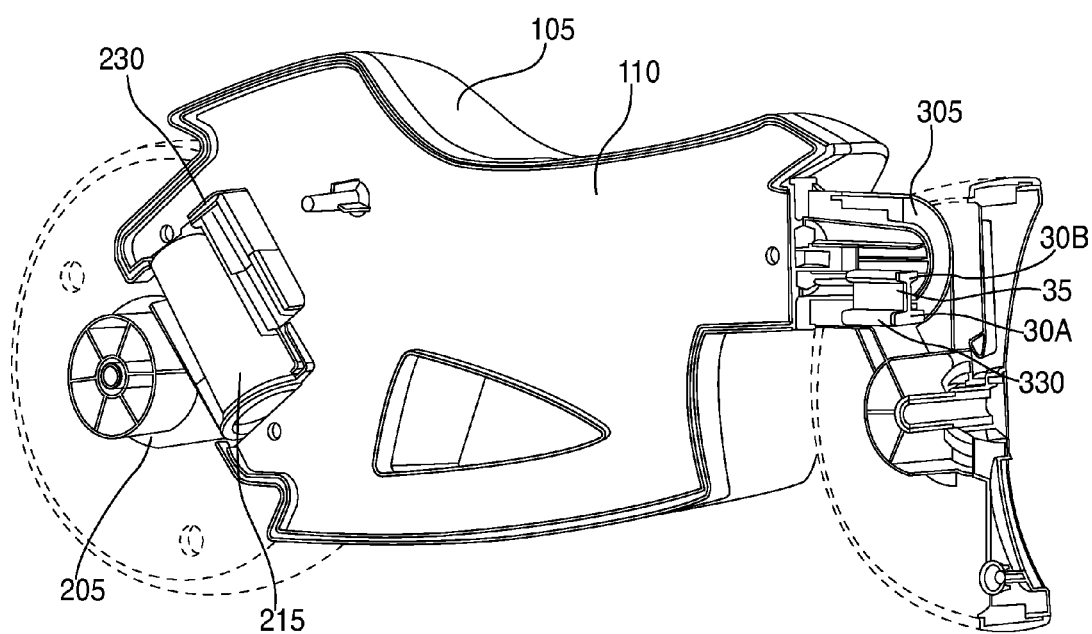
FIG. 11 is a schematics view taken along line 11-11 of FIG. 8A, showing two resilient pieces at the front shaft connector.

FIG. 11 is a cross-sectional perspective view taken along line 11-11 of FIG. 8A. In this embodiment, the resilient spring piece "I-beam" 330 located in the rear of the vehicle is positioned within the rear shaft connector 305. The "I-beam" 330 is positioned such that there is abutting and biasing contact between one of the two flanges 30A and an inner shaft sleeve 315, thereby biasing the rear shaft connector 305 such that the vehicle steers in a specified direction. When the rider shifts his weight to the left, the top flange 30B of the I-Beam 330 is pulled towards the right, while the bottom flange 30A of the I-Beam 330 remains substantially in place.

Figure 12:
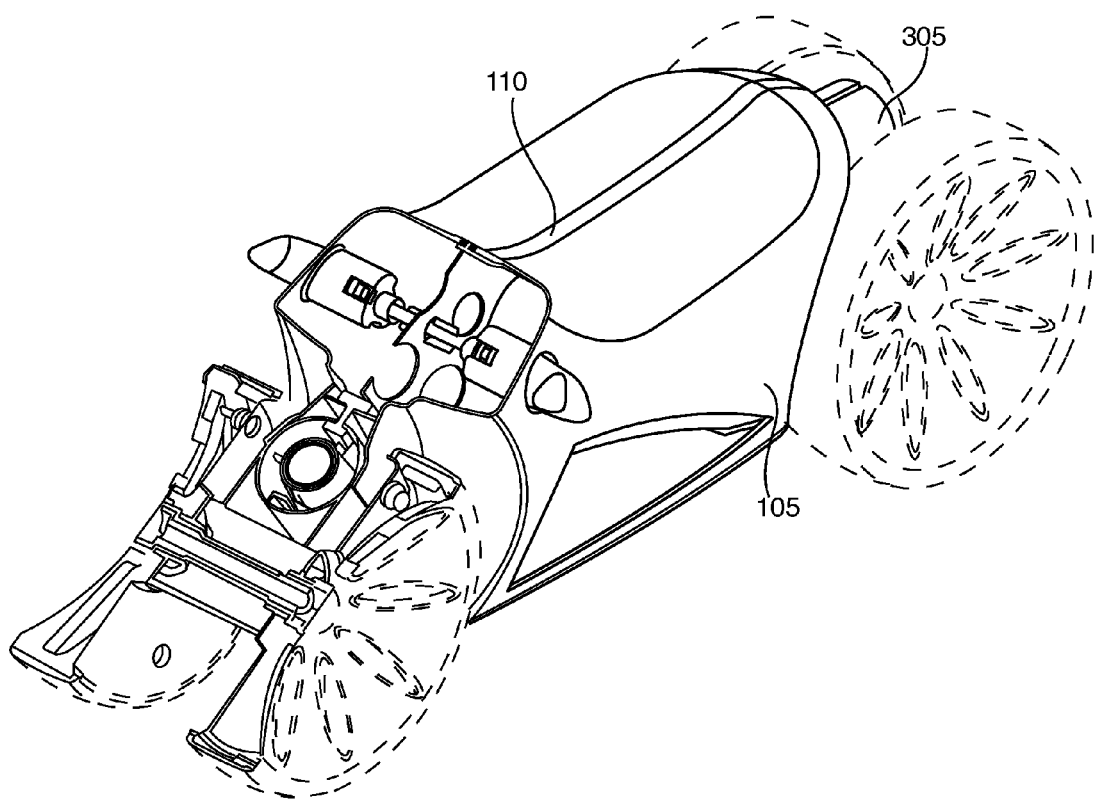
FIG. 12 is a perspective view of an embodiment of a self-straightening vehicle depicting a cross section of the front of the vehicle, illustrating position of the front resilient piece.

FIG. 12 depicts a cross-sectional perspective view of the front of the vehicle depicting the positioning of the components of the vehicle, including but not limited to the positioning of the resilient spring piece 230 in the inner space/catch 218 of the shaft connector 205 and shaft sleeve 215.

Figure 13A:
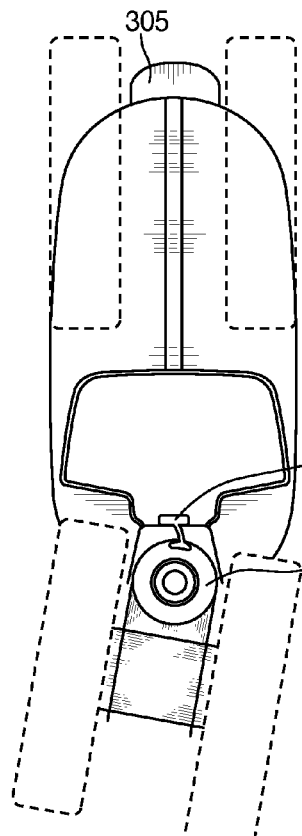
FIGS. 13A-C are graphical representations of the "I-beam" in the vehicle during different states: steering right, steering straight/at rest, and steering left, respectively.
Figure 13B:
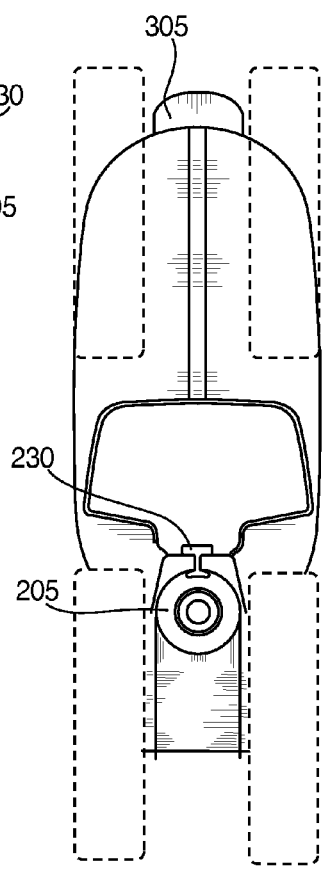
Figure 13C:
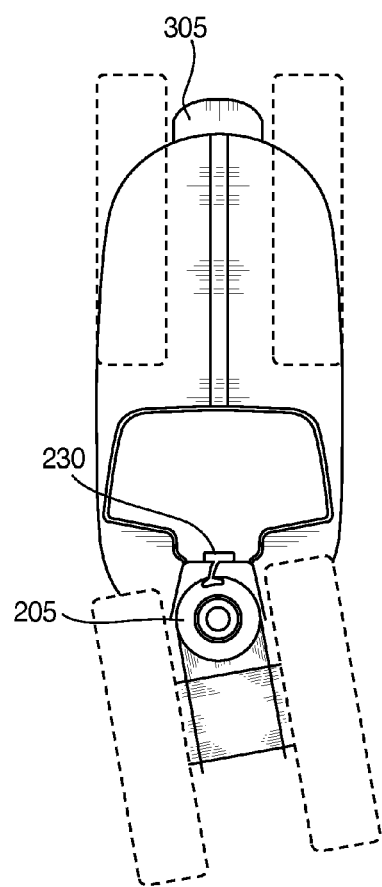

FIGS. 13A-C depict graphical representations of the front "I-beam" 230 in the vehicle during different states: steering right (FIG. 13A), steering straight/at rest (FIG. 13B), and steering left (FIG. 13C), respectively. These drawing figures also depict a contortion of the "I-beam" 230 as the vehicle steers to the left and the right.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

Thus, specific embodiments and applications of novel steering and suspension mechanism for a ride-on vehicle have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A vehicle, said vehicle comprising:
a main body having a leveled longitudinal axis;
a front shaft connector coupled to the main body;
a least one front wheel coupled to the front shaft connector;
a rear shaft connector coupled to the main body;
a least one rear wheel coupled to the rear shaft connector;

a biasing mechanism disposed between said main body and one of said front shaft connector and said rear shaft connector to bias one of said front shaft connector and said rear shaft connector in a straightening alignment such that at least one of said front wheel and said rear wheel is straightened to travel in a line parallel to the leveled longitudinal axis; and wherein the biasing mechanism is a resilient member which is a resilient "I-beam" having a first flange connected to a parallel second flange by a resilient web.

2. The vehicle as recited in claim 1, wherein at least one of the front shaft connector and the rear shaft connector is pivotably coupled to the main body.

3. The vehicle as recited in claim 1, wherein the resilient member has one end attached to the main body, and another end attached to at least one of said front shaft connector and said rear shaft connector, biasing the at least one of said front shaft connector and said rear shaft connector into a straightening position, and wherein a pivotal movement of at least one of said front shaft connector and said rear shaft connector will resiliently distort a portion of the resilient member.

4. The vehicle as recited in claim 1, wherein a longitudinal axis of the resilient "I-beam" parallels with a pivoting axis of at least one of said first connecting shaft and said rear connecting shaft.

5. The vehicle as recited in claim 1, wherein the resilient "I-beam" is made of a resilient material selected from a group consisting of silicone, rubber, and thermoplastic elastomer (TPE).

6. The vehicle as recited in claim 4, wherein the pivoting axis of the front connecting shaft is disposed at a first angle relative to the leveled longitudinal axis of the main body, wherein the first angle is between 25 to 55 degrees.

7. The vehicle as recited in claim 4, wherein the pivoting axis of the rear connecting shaft is disposed at a second angle relative to the leveled axis of the main body, wherein the second angle is between zero to 55 degrees.

8. The vehicle as recited in claim 6, wherein at least one of the front connecting shaft and the rear connecting shaft has an interior space and a slit disposed in parallel alignment with the corresponding pivoting axis, wherein the second flange is disposed in the interior space while the web is disposed through said slit; and wherein the web is resiliently distorted when at least one of the front connecting shaft and the rear connecting shaft pivots to a left or to a right direction.

9. The vehicle as recited in claim 1, wherein at least one of the front connecting shaft and the rear connecting shaft has an interior space and a slit disposed in parallel alignment with the corresponding pivoting axis, wherein the second flange is disposed in the interior space while the web is disposed through said slit; and wherein the web is resiliently distorted when at least one of the front connecting shaft and the rear connecting shaft pivots to a left or to a right direction.

10. The vehicle as recited in claim 4, wherein at least one of the front connecting shaft and the rear connecting shaft has an interior space and a slit disposed in parallel alignment with the corresponding pivoting axis, wherein the second flange is disposed in the interior space while the web is disposed through said slit; and wherein the web is resiliently distorted when at least one of the front connecting shaft and the rear connecting shaft pivots to a left or to a right direction.

11. The vehicle as recited in claim 7, wherein at least one of the front connecting shaft and the rear connecting shaft has an interior space and a slit disposed in parallel alignment with the corresponding pivoting axis, wherein the second flange is disposed in the interior space while the web is disposed through said slit; and wherein the web is resiliently distorted when at least one of the front connecting shaft and the rear connecting shaft pivots to a left or to a right direction.

* * * * *